(12) United States Patent
Akamatsu et al.

(10) Patent No.: US 7,918,606 B2
(45) Date of Patent: *Apr. 5, 2011

(54) ROLLING BEARING

(75) Inventors: Yoshinobu Akamatsu, Kuwana (JP); Masatsugu Mori, Kuwana (JP); Takuji Kobayashi, Kuwana (JP); Sun-Woo Lee, Kuwana (JP)

(73) Assignee: NTN Corporation, Osaka (JP)

( * ) Notice: Subject to any disclaimer, the term of this patent is extended or adjusted under 35 U.S.C. 154(b) by 1025 days.

This patent is subject to a terminal disclaimer.

(21) Appl. No.: 11/664,778

(22) PCT Filed: Oct. 7, 2005

(86) PCT No.: PCT/JP2005/018655
§ 371 (c)(1),
(2), (4) Date: Apr. 5, 2007

(87) PCT Pub. No.: WO2006/041040
PCT Pub. Date: Apr. 20, 2006

(65) Prior Publication Data
US 2009/0034892 A1     Feb. 5, 2009

(30) Foreign Application Priority Data
Oct. 8, 2004  (JP) ................. 2004-295653

(51) Int. Cl.
*F16C 19/00*  (2006.01)
(52) U.S. Cl. .......................................... 384/462
(58) Field of Classification Search ........... 384/462–475
See application file for complete search history.

(56) References Cited

U.S. PATENT DOCUMENTS

| | | | | |
|---|---|---|---|---|
| 3,951,476 A * | 4/1976 | Schulien et al. | ............ | 384/385 |
| 4,571,097 A * | 2/1986 | Lee et al. | ............ | 384/469 |
| 4,576,489 A * | 3/1986 | Bentele et al. | ............ | 384/469 |
| 6,733,181 B2 * | 5/2004 | Koiwa et al. | ............ | 384/465 |
| 7,293,919 B2 * | 11/2007 | Ueno et al. | ............ | 384/473 |
| 7,500,311 B2 * | 3/2009 | Shimomura | ............ | 29/898.1 |
| 2006/0239598 A1 | 10/2006 | Matsuyama et al. | | |

(Continued)

FOREIGN PATENT DOCUMENTS
JP         61-218829        9/1986
(Continued)

OTHER PUBLICATIONS

Japanese Office Action for Japanese Application No. 2005-293266, mailed on May 7, 2008 (3 pages).

(Continued)

*Primary Examiner* — James Pilkington
(74) *Attorney, Agent, or Firm* — Osha • Liang LLP

(57) ABSTRACT

A rolling bearing assembly has an inner race, an outer race and a plurality of rolling elements interposed between respective raceway surfaces of the inner and outer races. A stationary raceway member, which is one of the inner and outer races that are a raceway member and which is non-rotatable, is provided with a stepped face continued with the corresponding raceway surface and located in a direction away from the rolling elements, and is also provided with a gap defining piece having a tip held in face-to-face relation to the stepped face with a gap intervening between it and the stepped face and defining a flow path between a peripheral wall thereof and the stationary raceway member; there being provided a grease reservoir communicated with the flow path.

27 Claims, 8 Drawing Sheets

U.S. PATENT DOCUMENTS

2009/0103844 A1* 4/2009 Kobayashi et al. ............ 384/462

FOREIGN PATENT DOCUMENTS

| | | |
|---|---|---|
| JP | 62106126 | 5/1987 |
| JP | 63-180726 | 11/1988 |
| JP | 2-80815 | 3/1990 |
| JP | 5-22850 | 3/1993 |
| JP | 5-45246 | 6/1993 |
| JP | 6-35657 | 5/1994 |
| JP | 6-73450 | 10/1994 |
| JP | 8-338426 | 12/1996 |
| JP | 10-184705 | 7/1998 |
| JP | 11-108068 | 4/1999 |
| JP | 2000288870 | 10/2000 |
| JP | 2003-113998 | 4/2003 |
| JP | 2004-225807 | 8/2004 |
| JP | 2004330406 | 11/2004 |
| JP | 2005106245 | 4/2005 |
| JP | 2005-180629 | 7/2005 |
| JP | 2005-201346 | 7/2005 |
| JP | 2005-221042 | 8/2005 |

OTHER PUBLICATIONS

Patent Abstracts of Japan for Japanese Publication No. 02-080815, Publication date Mar. 20, 1990 (1 page).
Patent Abstracts of Japan for Japanese Publication No. 61-218829, Publication date Sep. 29, 1986 (1 page).
Japanese Office Action for Japanese Application No. 2005-293266, mailed on Aug. 5, 2008 (3 pages).
Notification of Transmittal of the Translation of the International Preliminary Report on Patentability (Chapter I or Chapter II of the Patent Cooperation Treaty) mailed on Apr. 19, 2007 (6 pages).
International Search Report for PCT/JP2005/018655 mailed Jan. 24, 2006 (2 pages).
JPO and INPIT Patent Abstract for JP,05-045246,U (1 page).
JPO and INPIT Patent Abstract for JP,05-022850,U (1 page).
Patent Abstracts of Japan 10-184705 dated Jul. 14, 1998 (2 pages).
Patent Abstracts of Japan 08-338426 dated Dec. 24, 1996 (2 pages).
Patent Abstracts of Japan 2004-225807 dated Aug. 12, 2004 (2 pages).
Patent Abstracts of Japan 2005-221042 dated Aug. 18, 2005 (2 pages).
Patent Abstracts of Japan 2005-180629 dated Jul. 7, 2005 (2 pages).
Patent Abstracts of Japan 2005-201346 dated Jul. 28, 2005 (1 page).
Patent Abstracts of Japan 11-108068 dated Apr. 20, 1999 (2 pages).
Patent Abstracts of Japan 2003-113998 dated Apr. 18, 2003 (2 pages).
Chinese Office Action for Chinese Patent Application No. 200910146368.8 dated May 11, 2010, and Partial English Translation thereof (5 pages).
U.S. Office Action Issued in related U.S. Appl. No. 12/087,418, mailed on Jun. 16, 2010, 10 pages.
Patent Abstracts of Japan for patent application with Publication No. 2005-106245, Publication Date: Apr. 21, 2005, 1 page.
Patent Abstracts of Japan for patent application with Publication No. 62-106126, Publication Date: May 16, 1987, 1 page.
Patent Abstracts of Japan for patent application with Publication No. 2000-288870, Publication Date: Oct. 17, 2000, 1 page.
Patent Abstracts of Japan for patent application with Publication No. 2004-330406, Publication Date: Nov. 25, 2004, 1 page.
Chinese Office Action in related patent application No. 200910146368.8, mailed on Sep. 17, 2010, and English translation thereof, 7 pages.
Notice of Allowance issued in U.S. Appl. No. 12/087,418 and mailed on Sep. 16, 2010, 4 pages.
Supplemental Notice of Allowance issued in U.S. Appl. No. 12/087,418, mailed on Oct. 22, 2010, 4 pages.

* cited by examiner

ROLLING BEARING

BACKGROUND OF THE INVENTION

The present invention relates to a rolling bearing assembly having a lubricating function, for example, a function of lubricating a main shaft or spindle of a machine tool with grease.

As a method of lubricating a spindle of the machine tool, a grease lubricating system that can be used maintenance-free; an air/oil lubricating system, in which a lubricant oil is mixed with a transport air so that the oil can be jetted into the interior of a bearing assembly through a nozzle; a jet lubricating system, in which a lubricant oil is jetted directly into the interior of a bearing assembly; and others have been well known. The machine tools in a state of the art are currently getting sped up in order to increase the machining efficiency and, to cope with this tendency, the air/oil lubricating system that can be sped up relatively inexpensively and easily is increasingly employed in most cases. However, since the air/oil lubricating system requires the use of air and oil supply devices as ancillary facilities and a large amount of air is also required, it has some problems associated with cost, noise, energy saving and resource saving. Also, an additional problem is found in that scattering of the oil leads to environmental contamination. In order to alleviate those problems, speeding up with the grease lubricating system has now come to attract attention of those skilled in the art and the demands therefor are indeed increasing.

Considering that the grease lubricating system is such as to accomplish the lubrication a bearing assembly only with a quantity of grease filled in the bearing assembly during the assemblage of the latter, it is generally considered that if the bearing assembly employing the grease lubricating system is operated at a high speed, degradation of the grease and a loss of the oil film on the raceway surface, particularly inner race, tend to occur as a result of heat evolved in the bearing assembly, resulting in a premature seizure. Particularly, in a high speed operating region, in which the dn value exceeds 1,000,000 (bearing inner diameter (mm)×number of revolutions (rpm)), it is virtually difficult to warrant the lifetime of the grease.

As a means to prolong the grease lifetime, various suggestions have recently been made. One of those recent suggestions includes the use of a grease reservoir in a portion of the raceway surface of the outer race to enable the bearing assembly to be operated at high speed with the lifetime of the grease increased (such as disclosed in, for example, the Japanese Laid-open Patent Publications No. 11-108068). Another one of those recent suggestion includes the use of a grease supply device provided externally to the spindle for supplying a quantity of grease to the bearing assembly to lubricate the latter (such as disclosed in, for example, the Japanese Laid-open Patent Publications No. 2003-113998).

However, it has been found that none of the foregoing suggestions is satisfactory when the number of revolutions (i.e., >dn value of 1,500,000) comparable to that achieved with the air/oil lubricating system and the maintenance-free feature are taken into consideration.

In view of the foregoing, the technology disclosed in the Japanese Laid-open Patent Application No. 11-108068 has been evolved in such a way that a gap, which communicates a grease reservoir, provided in close proximity to a stationary raceway member (for example, an outer race), with the vicinity of the raceway surface of the stationary raceway member, is formed in an peripheral surface of the raceway surface of the stationary raceway member, so that a base oil of the grease within the grease reservoir can be moved through the gap to a portion adjacent the raceway member by means of the capillary action of a thickening agent.

The lubricating system, in which the base oil is moved by means of the capillary action of the thickening agent as discussed above has been found involving a problem in that the base oil does not flow unless the oil is consumed at a tip of the gap, that is, a region in the vicinity of the raceway surface and, therefore, the supply of the lubricant oil tends to be too late at an operating condition such as an abrupt acceleration, failing to achieve an stabilized operation.

SUMMARY OF THE INVENTION

In view of the foregoing, the present invention is intended to provide a rolling bearing assembly, in which solely the grease filled in the bearing assembly is utilized to accomplish a high speed operation, increased lifetime, maintenance-free feature and stabilized lubricant supply.

The rolling bearing assembly according to a first construction of the present invention is a rolling bearing assembly which includes an inner race, an outer race and a plurality of rolling elements interposed between respective raceway surfaces of the inner and outer races; wherein one of the inner race and the outer race is a non-rotatable stationary raceway member, wherein the stationary raceway member is provided with a stepped face continued with the corresponding raceway surface, wherein the stepped face extends in a radial direction away from the rolling elements, wherein the stationary raceway member is provided with a gap defining piece having a tip held in face-to-face relation to the stepped face to form a gap between the tip and the stepped face, the gap defining piece defining a flow path between a peripheral wall thereof and the stationary raceway member; there being provided a grease reservoir communicated with the flow path; and wherein the gap between the stepped face and the tip of the gap defining piece is of a size sufficient to reserve a base oil of a grease at all times and also to allow the base oil to be supplied to the raceway surface by means of an air current in the vicinity of the raceway surface and a volumetric expansion of the base oil, which are both induced by rotation of the bearing assembly.

The rolling bearing assembly according to the first construction is used with the grease filled in the grease reservoir and the flow path formed between the stepped face of the stationary raceway member and the peripheral wall of the gap defining piece. The grease is filled within the bearing assembly as an initial lubricant oil. Accordingly, during a halt of the bearing assembly, the base oil of the grease moves from the flow path to the gap by the effect of a thickening agent contained in the grease and the capillary action taking place in the gap and is retained in an oily state within the gap by the cumulative effect of the capillary action and the surface tension. When the bearing assembly is operated, the base oil reserved within the gap is discharged from the gap by the effect of a volumetric expansion, brought about by temperature increase in the stationary raceway member induced by the operation, and an air current induced by revolution and rotation of the rolling elements, so that it can be continuously supplied to a rolling element contact region after having moved while attaching to the raceway surface of the stationary raceway member. The amount of the base oil flowing from the gap to the rolling element contact region can be adjusted by changing the size of the gap within the limit in which the capillary action takes place.

In such case, since the gap referred to above is that defined between the stepped face continued to the raceway surface and the gap defining piece and is positioned below the rolling elements at a location close to the raceway surface and since the base oil of the grease is reserved and retained at all times, that is, since the lubricant oil is retained in the close vicinity of the raceway surface in an oily state at all times, the supply of the lubricant oil can take place quickly and assured even when an abrupt acceleration is effected from the halt. For this reason, malfunctioning of the operation resulting from a failure to lubricate can be minimized and a stabilized operation can be expected. Also, when the gap size of the gap referred to above is changed, the amount of the lubricant oil to be supplied can be adjusted, enabling a maintenance-free high speed operation and increase of the lifetime of the bearing assembly.

The rolling bearing assembly according to a second construction of the present invention is a rolling bearing assembly which comprises an inner race, an outer race and a plurality of rolling elements interposed between respective raceway surfaces of the inner and outer races; wherein one of the inner race and the outer race is a non-rotatable stationary raceway member, wherein the stationary raceway member is provided with a stepped face continued with the corresponding raceway surface, wherein the stepped face extends in a radial direction away from the rolling elements wherein the stationary raceway member is provided with a gap defining piece having a tip held in face-to-face relation to the stepped face to form a gap between the tip and the stepped face, the gap defining piece defining a flow path between a peripheral wall thereof and the stationary raceway member; there being provided a grease reservoir communicated with the flow path; and wherein a base oil moving medium for facilitating a supply of a base oil of a grease from the grease reservoir to the flow path in the gap defining piece. The base oil moving medium referred to above may be a piece of paper or a piece of woven textile.

Even in the case of the second construction, since the gap referred to above is formed between the stepped face continued to the raceway surface and the gap defining piece and is positioned below the rolling elements at a location close to the raceway surface and since the base oil of the grease is reserved and retained at all times, the supply of the lubricant oil can take place quickly and assured even when an abrupt acceleration is effected from the halt. In the case of the second construction, since the movement of the base oil is facilitated further by the capillary action taking place in the base oil moving medium, the movement of the grease base oil takes place favorably and assuredly and the amount of such movement can be increased further. Also, by suitably selecting the material for and the circumferential length of the base oil moving medium, the amount of the grease base oil to be supplied can be adjusted, thus allowing the adjustment to be effected to suit to an operating condition of the bearing assembly.

In the present invention, the stationary raceway member may be the outer race. Where the stationary raceway member is the outer race, the stepped face referred to previously is provided in the outer race, but a continuity of the base oil between the gap and the raceway surface can be ensured since when the bearing assembly is rotated with the grease filled therein, the filled grease scatters towards an inner peripheral portion of the outer race under the influence of a centrifugal force. For this reason, the effect of supply of a portion of the base oil consumed as a lubricant oil at the rolling element contact region from the grease reservoir to the raceway surface through the gap can be enhanced, resulting in a further stabilized supply of the lubricant oil.

Also, in the present invention, the grease reservoir may be provided on one side axially relative to the raceway surface and a mist recovery and recycling module for recovering a mist within the bearing assembly, agglomerating it and returning the resultant agglutinate to a location in the vicinity of the raceway surface may also be provided on the other side axially relative to the raceway surface.

In the case of this construction, the supply of the grease from the grease reservoir and the reuse of the misted grease by the mist recovery and recycling module are performed, and by the cumulative effect of both of them, only the grease filled in the bearing assembly is utilized to realize a speed-up and an increased lifetime and the maintenance-free feature.

It is to be noted that the grease reservoir may be provided in one of them and a non-contact seal may be provided in place of the mist recovery and recycling module.

Further, in the present invention, the bearing assembly may be an angular ball bearing having an angle of contact defined from a vertical axis, and the stepped face may then be provided in continuance with an edge portion of the raceway surface, and is formed in a direction opposite the angle of contact. If the rolling bearing assembly is an angular ball bearing assembly, positioning of the stepped face on one side opposite to the direction in which the angle of contact generates can facilitate arrangement of the stepped face below the rolling elements. The stepped face can be brought to a position close to the center of the rolling elements, enabling the lubricant oil to be supplied efficiently from the stepped face towards the raceway surface.

Furthermore, in the present invention, the grease reservoir referred to above may be defined by a grease reservoir forming component, which comprises a spacer, provided adjacent the stationary raceway member, and a grease reservoir forming component main body provided on one of inner and outer peripheral sides of the spacer and adjacent to a bearing space. In this case, a sealing member may be interposed between respective mating surfaces of the spacer and stationary raceway member.

When the grease reservoir forming component is made up of the spacer and the grease reservoir forming component main body, the grease reservoir can be formed easily, but there is the possibility that the base oil of the grease within the grease reservoir may leak through an interface between the respective mating surfaces of the spacer and stationary raceway member by the capillary action. This leakage of the base oil can be prevented by the sealing member referred to above. Thus, since the leakage of the base oil outwardly of the bearing assembly is minimized, the amount of the oil used for lubrication increases, resulting in increase of the lubrication lifetime.

Also, in the present invention, where the grease reservoir is defined by a grease reservoir forming component, which comprises a spacer, provided adjacent the stationary raceway member, and a grease reservoir forming component main body provided on one of inner and outer peripheral sides of the spacer and adjacent to a bearing space, the spacer may be provided with a collar mountable on a peripheral surface of the stationary raceway member on one side adjacent a bearing space. In this case, a sealing member may be interposed between the collar and the stationary raceway member at a location where the collar is mounted on the stationary raceway member.

If the grease reservoir forming component is made up of the spacer and the grease reservoir forming component main body, the spacer and the stationary raceway member altogether form an non-interlock structure and, therefore, inconveniences will occur during, for example, assemblage. However, when the collar is provided in the spacer and is mounted on the stationary raceway member as hereinabove described, the both can form an interlocked structure in the sense that the both can be handled as a single unitary component, with the assemblability increased consequently. Also, the presence of the sealing member interposed between the collar and the stationary raceway member is effective not only to avoid a possible separation of the collar but also to prevent the grease base oil within the grease reservoir from leaking out of the bearing assembly. For these reasons, the spacer and the stationary raceway member can be assuredly interlocked together and, since the grease oil can be assuredly supplied onto the raceway surface of the race, the bearing assembly can be operated at high speeds and the lubrication lifetime can be prolonged.

In addition, in the present invention, the stationary raceway member may be provided with a raceway member extension for forming the grease reservoir and extending in a widthwise direction and the grease reservoir may be made up of this raceway member extension and a unitary grease reservoir forming component provided on one side of the raceway member extension adjacent a bearing space.

If the use is made of the raceway member extension is made and a spacer equivalent corresponding to the spacer referred to above is integrated with the stationary raceway member, the mating surfaces liable to oil leakage such as occurring where a separate spacer is employed can be eliminated. Because of this, no problem associated with leakage of the grease base oil from the mating surfaces will occur. Also, since the spacer equivalent is integrated with the stationary raceway member to define the grease reservoir, the assemblability of the bearing assembly can be increased and increase of the assembling precision can be expected as a result of reduction in number of component parts used.

Again in the present invention, a peripheral surface of the tip of the gap defining piece on a bearing space side, which is continued to an end face at the tip of the gap defining piece, may be formed as a tapered surface approaching the rolling elements and a distance between this tapered surface and the rolling elements may be chosen to be equal to or smaller than 0.2 mm.

Similarly, in the present invention, a peripheral surface of the tip of the gap defining piece on a bearing space side, which is continued to an end face at the tip of the gap defining piece, may be formed as a curved surface of an arcuately sectioned configuration having a center of curvature aligned with a center of each of the rolling elements and a distance between this curved surface and each rolling element may be chosen to be equal to or smaller than 0.2 mm.

The grease base oil discharged from the tip of the gap defining piece may flow outwards while adhering to and hence damping an outer surface of the grease reservoir forming component without being used as a bearing lubricant oil. However, to deal with this problem, if the gap between the peripheral surface of the tip of the gap defining piece on the side of the rolling elements and the rolling elements is chosen to be equal to or smaller than 0.2 mm so as to provide a minute gap sufficient to avoid contact thereof with the rolling elements, the oil component tending to flow outwards while adhering to and hence damping the outer surface of the grease reservoir forming component can be allowed to damp the surfaces of the rolling elements at areas within the minute gap and can thus be effectively utilized as a lubricant oil. For this reason, the amount of the oil used to lubricate the bearing can increase and the reliability of lubrication can also increase, resulting in increase of the lubrication lifetime.

If the peripheral surface of the tip of the gap defining piece on the bearing space side is formed as the tapered face as hereinbefore described, an effect of causing an adherence to the surfaces of the rolling elements can be obtained. On the other hand, if the peripheral surface of the tip of the gap defining piece is formed as the arcuately sectioned curved surface, transfer of the oil to the rolling elements can take place by the arcuately curved surface in its entirety and, therefore, it is more effective than the use of a tapered surface.

Furthermore, in the present invention, the stationary raceway member may be an outer race and the grease reservoir may be defined by a grease reservoir forming component provided in an inner periphery of the outer race or a spacer adjoining the outer race, in which case an inner peripheral surface of the grease reservoir forming component and an outer peripheral surface of the inner race are provided with respective tapered faces opposed to each other with a minute gap intervening therebetween and having a large diameter on one side adjacent a center of the bearing assembly.

When a portion of the inner diametric surface of the grease reservoir forming component and a portion of the inner race outer diametric surface are opposed to each other by means of the tapered faces with a minute gap intervening therebetween, the oil outflowing along the outer surface of the grease reservoir forming component adheres to the inner race outer diametric surface at the opposed area. The oil adhering to the inner race outer diametric surface then move by the effect of the surface tension of the oil and the centrifugal force acting on the oil along the tapered surfaces while adhering in a direction inwardly of the bearing assembly. Accordingly, the amount the oil flowing outwardly of the bearing assembly decreases and the amount of the oil used as the lubricant oil increases, thus resulting in increase of the lubrication lifetime.

Where the tapered faces are employed, the tapered face of the inner race has a first edge and a second edge, the inner race having a larger diameter at a location of the first edge than at a location of the second edge, and the first edge is positioned directly on an inner diametric side of a retainer for retaining the rolling elements or, alternatively, the first edge may be positioned within a bearing axial direction width of the rolling elements.

When the edge of the inner race tapered face is positioned within the width of the retainer or within the width of the rolling elements, the oil flowing while adhering to the inner race tapered face can, even though scattered vertically by the effect of the centrifugal force, be trapped by the retainer or the rolling elements and can then be utilized as a bearing lubricating oil.

Moreover, where the use is made of the tapered faces as hereinabove described and when the rolling bearing assembly is used with its longitudinal axis oriented vertically, the grease reservoir forming component may have a side wall portion oriented towards an intermediate point of a width of the bearing assembly and having the gap defining piece continued from an outer diametric side end thereof, in which case an outer surface of this side wall portion is formed as an inclined surface having a small diameter side inclined away from the intermediate point of the width of the bearing assembly.

If the side wall portion of the grease reservoir forming component is formed as the inclined surface, the oil tending to flow along the outer diametric surface of the grease reservoir forming component, where the rolling bearing assembly is held in a vertically oriented posture, can be more effectively caused to adhere to the tapered face of the inner race particularly.

Yet, in the present invention, the widthwise position of the stepped face of the stationary raceway member may be chosen to lie within a region, in which it will not interfere with an osculating ellipse with the rolling element in the stationary raceway member, and close to this osculating ellipse.

Unless the widthwise position of the stepped face interfere with the osculating ellipse, and even if the stepped face is brought to a position close to a portion of the raceway surface of the stationary raceway member, where the rolling elements rollingly move, no problem occur in a function of the bearing assembly. Thus, if the position of the stepped face of the stationary raceway member is brought to a position as close to the rolling portion of the raceway surface of the stationary raceway member as possible, the lubricant oil supplied from the grease reservoir through the gap defining piece can be efficiently introduced into the bearing assembly. Hence, the grease base oil can be assuredly supplied onto the raceway surface of the stationary raceway member, allowing the reliability in bearing lubrication to be increased.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
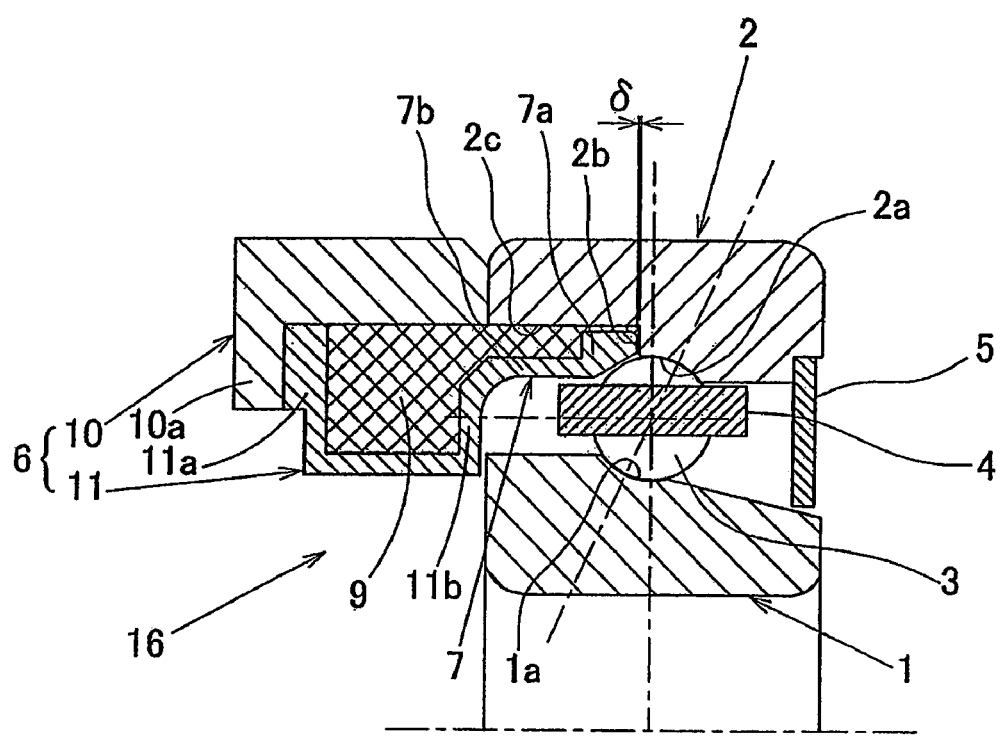
FIG. 1 is a fragmentary sectional view of a rolling bearing assembly according to a first preferred embodiment of the present invention.

A first preferred embodiment of the present invention will be described in detail with reference to FIGS. 1 and 2. Referring to FIG. 1, a rolling bearing assembly includes an inner race 1, an outer race 2 and a plurality of rows of rolling elements 3 interposed between respective raceway surfaces 1a and 2a of the inner and outer races 1 and 2 and is provided with a grease reservoir forming component 6 and a gap defining piece 7. The rolling elements 3 are retained by a retainer 4, and one of opposite open ends of a bearing space delimited between the inner and outer race is sealed by a sealing member 5. A leakage of a grease, filled in the interior of the rolling bearing assembly, to the outside thereof is prevented by the sealing member 5. This rolling bearing assembly is in the form of an angular ball bearing and the sealing member 5 is provided at one end of the bearing assembly on a back side thereof, whereas the grease reservoir forming component 6 and the gap defining piece 7 are provided on a front side of the bearing assembly. On the front side of the bearing assembly, the grease reservoir forming component 6 concurrently serves as a seal to prevent the grease from leaking from the front side of the bearing assembly. A hatched area shown in FIG. 1 represents a portion where the grease is filled.

The outer race 2, which defines a stationary raceway member, is provided with a stepped face 2b continued with a raceway surface 2a thereof and located in a direction away from the rolling elements 3, that is, in continuance with an edge portion of the raceway surface 2a on one side opposite to a direction in which an angle of contact generates. This stepped face 2b is a face extending radially outwardly from the raceway surface 2a and confronting a front side of the outer race and is continued with an inner peripheral surface portion 2c of the outer race 2 on the front side thereof.

Figure 4:
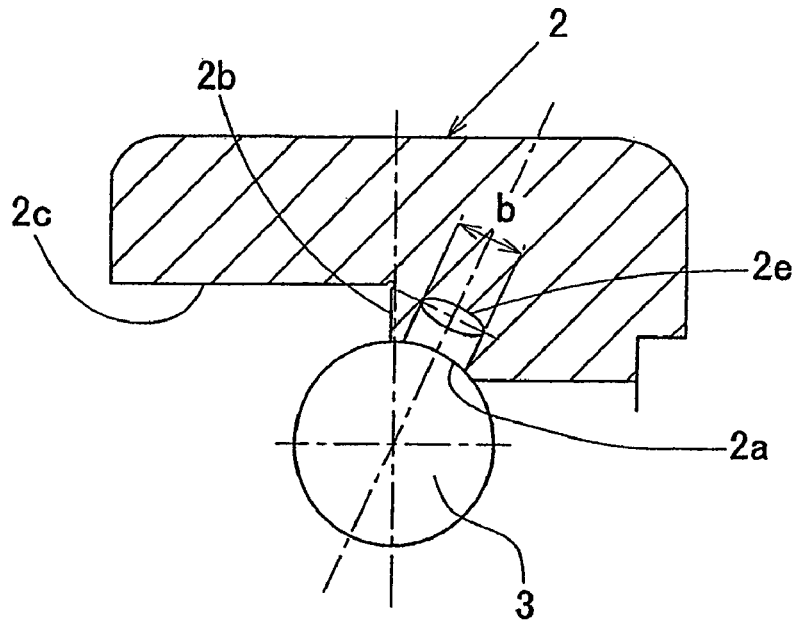
FIG. 4 is an explanatory diagram showing the relation between a stepped face of an outer race and an osculating ellipse in a modified form of the first embodiment.

The position of the stepped face 2b with respect to the bearing widthwise direction may be within a region, in which it will not interfere with an osculating ellipse 2e with the rolling elements 3 and close to this osculating ellipse 2e such as shown in a modification shown in FIG. 4. More specifically, the position of the stepped face 2b with respect to the bearing widthwise direction may be aligned substantially with the center of each rolling element 3, or on an outer race rear surface side rather than the center of each rolling element 3, provided that it will not interfere with the osculating ellipse 2e. The osculating ellipse 2e referred to above represents an ellipse representative of a region of stresses acting on the bearing assembly when the load is maximum. In this figure, the osculating ellipse 2e is shown as having a major axis of a length indicated by b.

Referring to FIG. 1, the grease reservoir forming component 6 is a ring-shaped component having a grease reservoir 9 defined therein and is provided in contact with an end face of the outer race 2 on the front side. In the illustrated instance, the grease reservoir forming component 6 includes an outer race positioning spacer 10, provided in contact with the end face of the outer race 2 on the front side, and a grease reservoir forming component main body 11 of an outwardly oriented groove shape mounted on an inner peripheral surface of the outer race positioning spacer 10. An interior space delimited between the outer race positioning spacer 10 and the grease reservoir forming component main body 11 is rendered to be a grease reservoir 9. The outer race positioning spacer 10 has a side wall portion 10a on one side of an inner peripheral surface opposite to the outer race 2 and with which a side wall portion 11a of the grease reservoir forming component main body 11 contacts. The grease reservoir forming component main body 11 is positioned axially relative to the outer race positioning spacer 10 when the side wall portion 11a is brought into contact with an inner side of the side wall portion 10a of the outer race positioning spacer 10 after a quantity of grease has been filled in the grease reservoir 9.

A sealing member not shown is interposed between an outer diametric surface of the side wall portion 11a in the grease reservoir forming component main body 11 and an inner diametric surface of an outer race positioning spacer 10 that is opposed thereto, or the grease reservoir forming component main body 11 and the outer race positioning spacer 10 are bonded together with a bonding material. A sealing member 51 is interposed between respective mating surfaces of the outer race positioning spacer 10 and the outer race 2 as shown in FIG. 2. The sealing member 51 is in the form of an O-ring, which is engaged in a circumferential groove 52 defined in the mating surface of the outer race positioning spacer 10. With those, a grease leakage prevention is accomplished.

The gap defining piece 7 is in the form of a ring-shaped member arranged along an inner peripheral surface portion 2c of the outer race 2 with its tip oriented towards the stepped face 2b so as to define a flow path 14 and a gap 15 between it and the outer race 2. This gap defining piece 7 is formed integrally with the grease reservoir forming component main body 11. In other words, it extends integrally from an outer diametric end portion of the side wall portion 11b of the grease reservoir forming component main body 11, which is on one side adjacent the bearing assembly.

Figure 2:
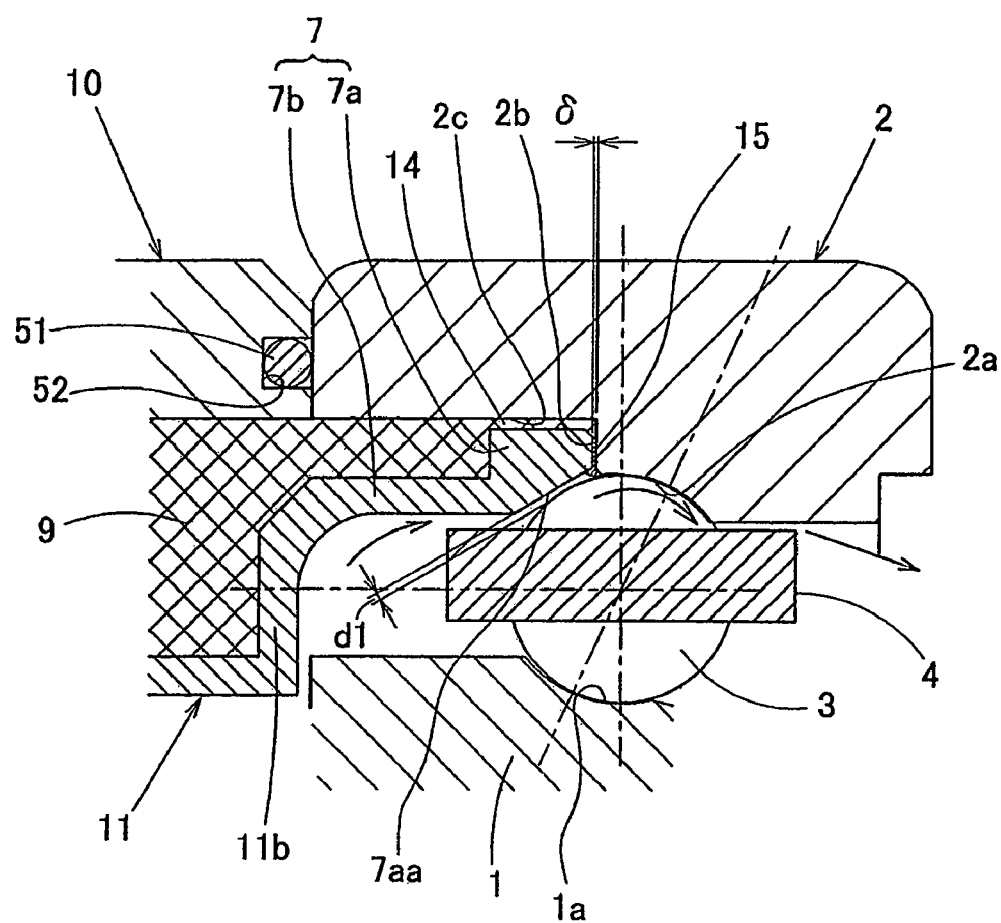
FIG. 2 is a fragmentary enlarged sectional view of a portion of the rolling bearing assembly.

As shown in FIG. 2 on an enlarged scale, the flow path 14 referred to above is defined by a peripheral wall of the tip 7a of the gap defining piece 7 and an inner peripheral surface portion 2c of the outer race 2 in face-to-face relation therewith. The gap defining piece 7 has its tip 7a extending to a position near to the stepped face 2b of the outer race 2, and an end face of the tip 7a of the gap defining piece 7 cooperates with the stepped face 2b of the outer race 2, that is held in face-to-face relation therewith, to define an axial gap 15 of a small gap size δ. This gap 15 is communicated with the flow path 14 and opens at an edge portion of the raceway surface 2a. The distance d1 between a tapered face 7aa and the rolling elements 3 is preferably such as to represent a minute gap sufficient to allow an oil component adhering to and hence damping the tapered face 7aa to flow onto surfaces of the rolling elements 3 and is preferably of a value equal to or smaller than 0.2 mm. The gap size δ of the gap 15 is chosen to be about 50 μm sufficient to allow the capillary action to take place.

An inner peripheral surface continued from the end face of the tip 7a of the gap defining piece 7 is rendered to be the tapered face 7aa nearing the rolling elements 3, so that the lubricant oil can be easily accommodated between this tapered face 7aa and the rolling elements 3. A base portion 7b of the gap defining piece 7 is rendered to have a diameter smaller than that of the tip 7a. A portion bound between an outer peripheral surface of this base portion 7b and the inner peripheral surface portion 2c of the outer race 2 forms a portion of the grease reservoir 9, and the flow path 14 referred to above is communicated with this grease reservoir 9.

The operation of the foregoing construction will now be described. During assemblage of the bearing assembly, the grease is filled into the grease reservoir 9 and also into the flow path 4. The grease is also filled into the interior of the bearing assembly as that for an initial lubrication. During a halt of the bearing assembly, by the effect of a thickening agent contained in the grease and the capillary action in the gap 15, a base oil of the grease fluidizes from the flow path 14 into the gap 15 and, by the cumulative effects of this capillary action and the surface tension of the oil, the base oil is retained within the gap 15 in the form of an oil film. When the bearing assembly is operated, the base oil reserved in the gap 15 is expelled outwardly from the gap 15 by the effect of a volumetric expansion, brought about as a result of an increase of the temperature of the outer race 2 induced by the operation of the bearing assembly, and an air current, induced by revolution and rotation of the rolling elements 3, to move while adhering to the raceway surface 2a of the outer race, to thereby continuously refill a rolling element contact region. The amount of the base oil flowing from the gap 15 to the rolling element contact region can be adjusted by changing the gap size δ of the gap 15 within a limit in which the capillary action takes place. In other words, the greater the gap size δ of the gap 15, the larger the amount of the base oil flowing into the interior of the bearing assembly, thus allowing the adjustment to be effected to suit to an operating condition of the bearing assembly.

As hereinabove described, since in this rolling bearing assembly, the base oil of the grease is reserved and maintained at all times within the gap 15 opening at an extremely close position of the raceway surface 2a of the outer race 2 and this base oil is supplied to the rolling element contact region simultaneously with the start of operation, the supply of the lubricant oil can be assuredly effected even at an abrupt acceleration following the halt, minimizing a malfunctioning that will otherwise be brought about a lubricating failure. Also, if the gap size δ of the gap 15 is changed, the amount of the lubricant to be supplied can be adjusted, enabling the bearing assembly to be operated maintenance-free at a high speed and to have an increased lifetime.

Since an inner diametric surface continued to the end face of the tip 7a of the gap defining piece 7 is rendered to be the tapered face 7aa nearing the rolling elements 3 as hereinbefore described and, at the same time, the distance d1 between this tapered face 7aa and the rolling elements 3 is chosen to be equal to or smaller than 0.2 mm, the following advantages can be obtained. Specifically, if the distance d1 is too large, the grease base oil discharged from the tip of the gap defining piece 7 may flow outwards while adhering to and hence damping an outer surface of the grease reservoir forming component 11 without being used as a bearing lubricant oil. However, if the distance d1 between the stepped face 7aa and the rolling elements 3 is chosen to be equal to or smaller than 0.2 mm so as to provide a minute gap sufficient to avoid contact thereof with the rolling elements 3, the oil component tending to flow outwards while adhering to and hence damping the outer surface of the grease reservoir forming component 11 can be allowed to damp the surfaces of the rolling elements 3 at areas within the minute gap and can thus be effectively utilized as a lubricant oil.

Figure 5:
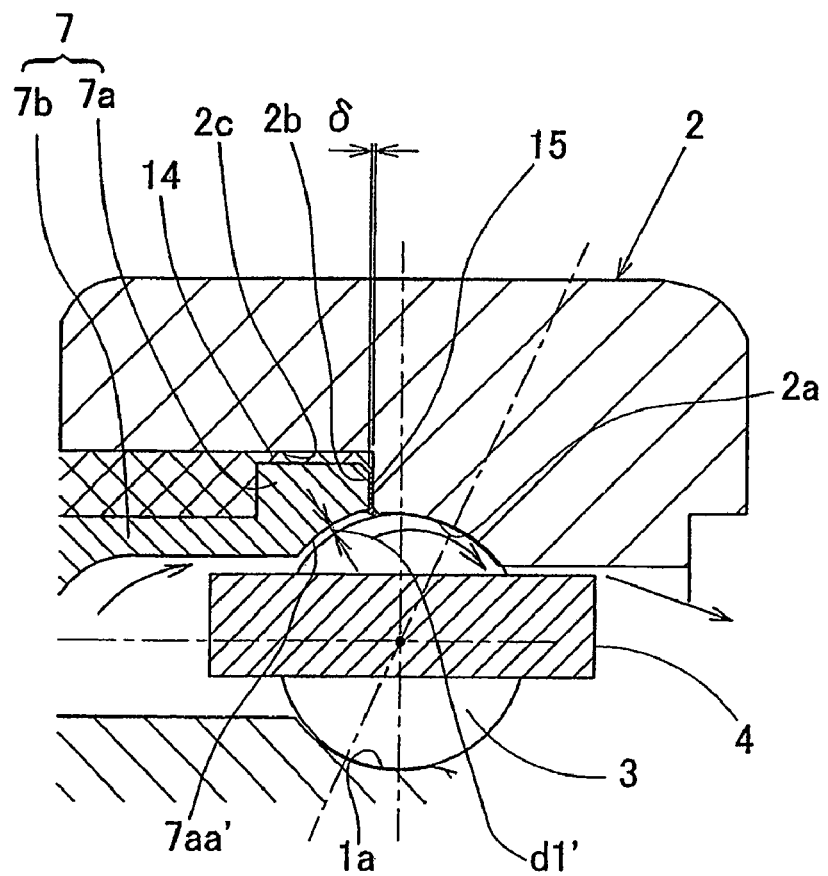
FIG. 5 is a fragmentary enlarged sectional view of the rolling bearing assembly according to another modified form of the first embodiment.

A peripheral surface of the tip of the gap forming piece 11 adjacent the bearing space may be a curved surface 7aa' of an arcuately sectioned configuration having a center of curvature aligned with the center of each rolling element 3 as shown in a modification in FIG. 5, rather than the tapered surface 7aa. Even in this case, the distance d1' between this curved surface 7aa' and the rolling elements 3 is chosen to be preferably equal to or smaller than 0.2 mm. Where the arcuately sectioned curved surface 7aa' is employed in this way, more effective is the use of the arcuately sectioned curved surface 7aa' than the use of the tapered surface 7aa as shown in FIG. 2, because transfer of the oil can take place from the entire curved surface 7aa' onto the rolling elements 3.

In any event, whichever the tapered surface 7aa or the arcuately curved surface 7aa' is employed, the oil outflowing in the manner described above can be allowed to oil or damp the rolling elements 3 and, therefore, the grease base oil supplied from the grease reservoir 9 and discharged through the tip of the gap defining piece 7 can be utilized as a lubricant oil with no waste. Accordingly, the amount of oil used to lubricate the bearing assembly can be increased, accompanying an increase of the reliability of lubrication and, also, an increase of the lubrication lifetime.

The axial position of the stepped face 2b of the outer race 2 may lie at a location as close to the osculating ellipse 2e as possible, provided that it will not interfere with the osculating ellipse 2e as hereinbefore described with reference to FIG. 4. Provided that it will not interfere with the osculating ellipse 2e, no hindrance occurs as a function of bearing even though the stepped face 2b is brought to a position nearing a portion of the raceway surface 2a of the outer race 2, where the rolling elements 3 move. Thus, if the stepped face 2b is brought to a location as close to the portion of the raceway surface 2a of the outer race 2b, where the rolling elements 3 move, as possible, the lubricant oil supplied from the grease reservoir 9 through the gap defining piece 7 can be efficiently introduced into the bearing assembly. In this way, the supply of the grease base oil onto the rolling element raceway surface of the outer race 2 can be ensured, resulting in a possible increase of the reliability in lubricating the bearing assembly.

Since the sealing member 51 is interposed between the respective mating surfaces of the outer race positioning spacer 10 and the outer race 2 as shown in FIG. 2, a grease leakage can be prevented. If those mating surfaces of the outer race positioning spacer 10 and the outer race 2 are held merely in tight contact with each other, there is a possibility that the base oil of the grease within the grease reservoir 9 may leak by the effect of the capillary action. The leakage of the base oil in this way can be prevented by the presence of the sealing member 51. Hence, when the respective surfaces of contact between the grease reservoir forming component main body 11 and the outer race positioning spacer 10 are bonded together with the use of a bonding material as hereinbefore described or a separate sealing member (not shown) is interposed therebetween, the leakage of the base oil can be prevented.

As discussed above, since the leakage of the base oil outwardly from the bearing assembly can be reduced and the amount of the oil used in lubrication can be increased, resulting in increase of the lubrication lifetime.

Figure 3:
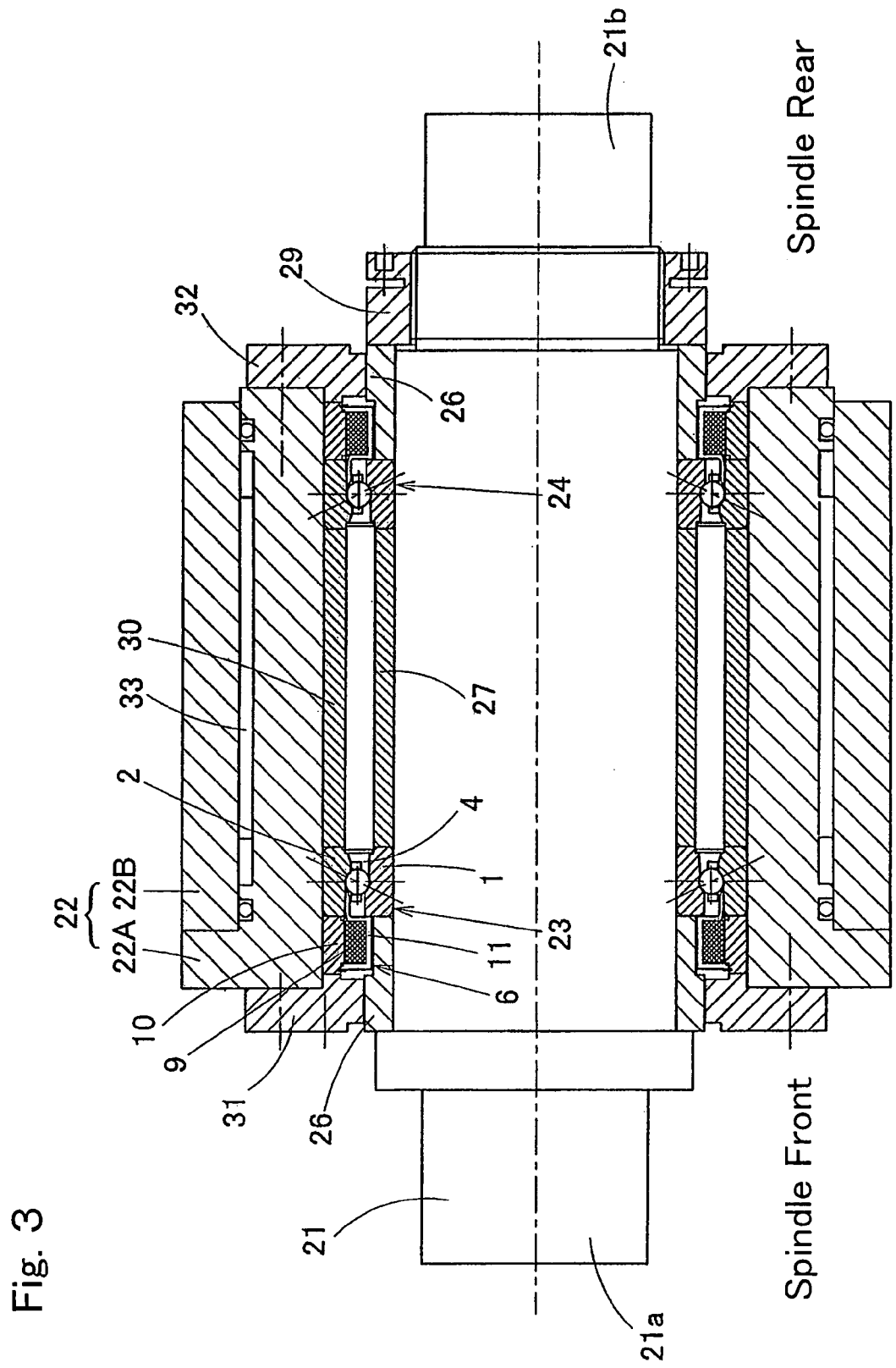
FIG. 3 is a sectional view of a spindle device of a machine tool, which utilizes the rolling bearing assembly.

FIG. 3 illustrates an example of a spindle device of a machine tool utilizing the rolling bearing assembly according to the previously described first embodiment. In this spindle device of the machine tool, the rolling bearing assembly is employed two in number in back-to-back relation with each other. Those two rolling bearings 23 and 24 rotatably support opposite ends of a spindle 21, respectively, within a housing 22. The inner race 1 of each of the rolling bearing assemblies 23 and 24 is positioned by inner race positioning spacers 26 and an inner race spacer 27 and is fastened to fix on the spindle 21 by means of an inner race fixing nut 29. The outer race 2 is positioned to fix within the housing 22 by means of outer race positioning spacers 10, an outer race spacer 30 and outer race holding caps 31 and 32. The housing 22 is of a structure in which a housing outer tube 22B is mounted on a housing inner tube 22A, and an oil flow groove 33 is provided in a mounting region thereof for cooling purpose.

The spindle 21 is provided at its front end portion 21a removably with a tool or work (not shown) through a chuck (not shown) and is connected at its rear end portion 21b with a drive source such as, for example, a motor through a rotation transmitting mechanism (not shown). The motor may be accommodated within the housing 22. This spindle device can be applied to various machine tools such as, for example, a machining center, a lathe, a milling machine, a grinding machine and so on.

According to the spindle device of the above described construction, various effects such as stabilized supply of the lubricant oil, speeding up, increased lifetime and maintenance-free feature in the rolling bearing assemblies 23 and 24 each structured according to the first embodiment can be exhibited effectively.

Figure 6:
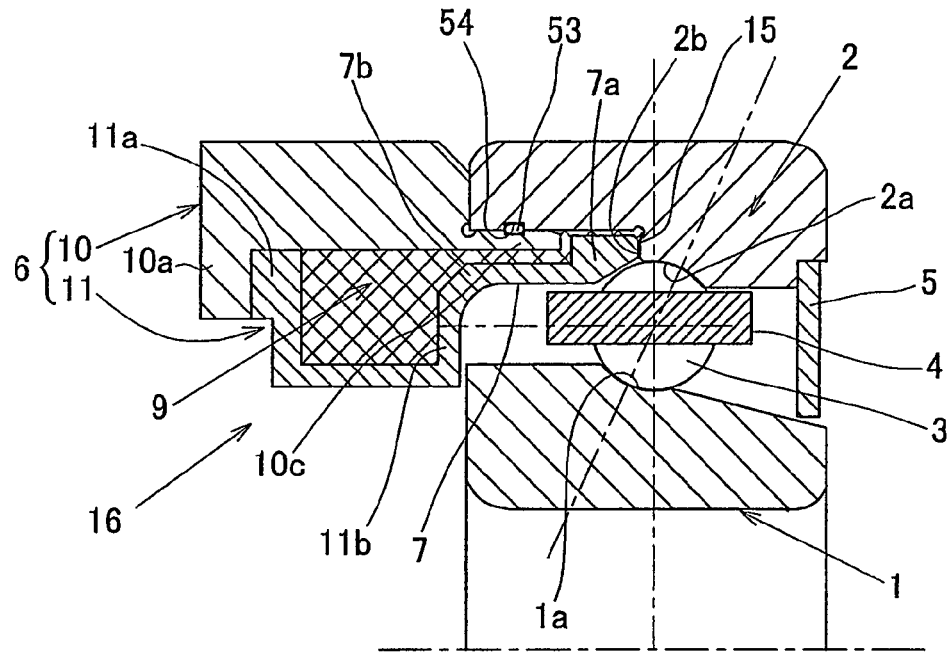
FIG. 6 is a fragmentary sectional view of the rolling bearing assembly according to a further modified form of the first embodiment.

FIG. 6 illustrates a further modified form of the rolling bearing assembly according to the first embodiment. In this modification, the rolling bearing assembly is similar to that shown in and described with reference to FIGS. 1 and 2, except that in this modification, the outer race positioning spacer 10 is provided with a collar 10c adapted to be mounted on an inner diametric surface of the outer race 2, which is a peripheral surface on one side adjacent the bearing space and a sealing member 53 is interposed between this collar 10c and a collar mounted portion of the outer race 2 where the collar 10c is mounted. The sealing member 53 is in the form of an O-ring and is engaged in an annular groove 54 defined in the inner diametric surface of the outer race 2. Other structural features thereof are similar to those shown in and described with reference to FIGS. 1 and 2.

Where as is the case with the embodiment shown in FIG. 1, the grease reservoir forming component 6 is made up of the outer race positioning spacer 10 and the grease reservoir forming component main body 11, the outer race positioning spacer 10 and the outer race 2 altogether form a non-interlocked structure and, therefore, inconveniences will occur during, for example, assemblage. However, when the collar 10c is provided in the outer race positioning spacer 10 and is mounted on the outer race 2 as hereinabove described, the both can form an interlocked structure in the sense that the both can be handled as a single unitary component, with the assemblability increased consequently. Also, the presence of the sealing member 53 interposed between the collar 10c and the outer race 2 is effective not only to avoid a possible separation of the collar 10c but also to prevent the grease base oil within the grease reservoir 9 from leaking out of the bearing assembly. For these reasons, the outer race positioning spacer 10 and the outer race 2 can be assuredly interlocked together and, since the grease oil can be assuredly supplied onto the raceway surface 2a of the outer race 2, the bearing assembly can be operated at high speeds and the lubrication lifetime can be prolonged.

Figure 7:
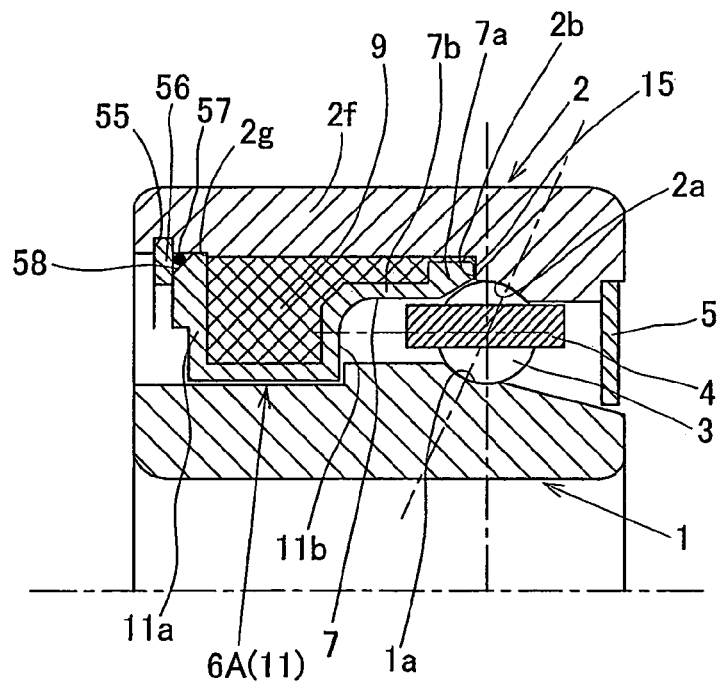
FIG. 7 is a fragmentary sectional view of the rolling bearing assembly according to a still further modified form of the first embodiment.

FIG. 7 illustrates a still further modified form of the rolling bearing assembly according to the first embodiment. The rolling bearing assembly in this still further modification is similar to that shown in and described with reference to FIGS. 1 and 2, except that in this modification, in place of the use of the outer race positioning spacer 10, a raceway member extension 2f for the formation of the grease reservoir 9 is provided so as to extend in a widthwise direction. The grease reservoir 9 is therefore made up of the raceway member extension 2f of the outer race 2 and a unitary grease reservoir forming component 6A provided on one side of the raceway member extension 2f adjacent the bearing space. In such case, the grease reservoir forming component 6A in its entirety is constituted by a grease reservoir forming component main body 11 shown and described in connection with the example of FIG. 1. The grease reservoir forming component 6A has a side wall portion (opposite side portion of bearing inward) 11a held in engagement with a positioning stepped face 2g provided in an inner diametric surface of the raceway member extension 2f and is fixed in position by a stop ring 56, mounted in an annular stop groove 55 provided in the vicinity of the positioning stepped face 2g, so as to assume a proper position axially of the outer race 2. An outer diametric edge of a surface of the side wall portion 11a of the grease reservoir forming component 6A, which confronts outwardly of the bearing assembly, is provided with a tapered cutout 58, and a sealing member 57 is interposed between this cutout 58 and the stop ring 56. This sealing member 57 is in the form of an O-ring.

The inner race 1 may have a width which is the same as that including the raceway member extension 2f of the outer race 2 or may have a width having no raceway extension 2f.

Where as described above the use is made of the raceway member extension 2f for the formation of the grease reservoir and a portion corresponding to the outer race positioning spacer 10 is integrated with the outer race 2, the mating surfaces liable to oil leakage such as occurring where a separate spacer is employed can be eliminated. Because of this, no problem associated with leakage of the grease base oil from the mating surfaces will occur. Also, since the raceway member extension 2f, which serves as a spacer equivalent, is integrated with the outer race 2 to define the grease reservoir 9, the assemblability of the bearing assembly can be increased and increase of the assembling precision can be expected as a result of reduction in number of component parts used.

Figure 8:
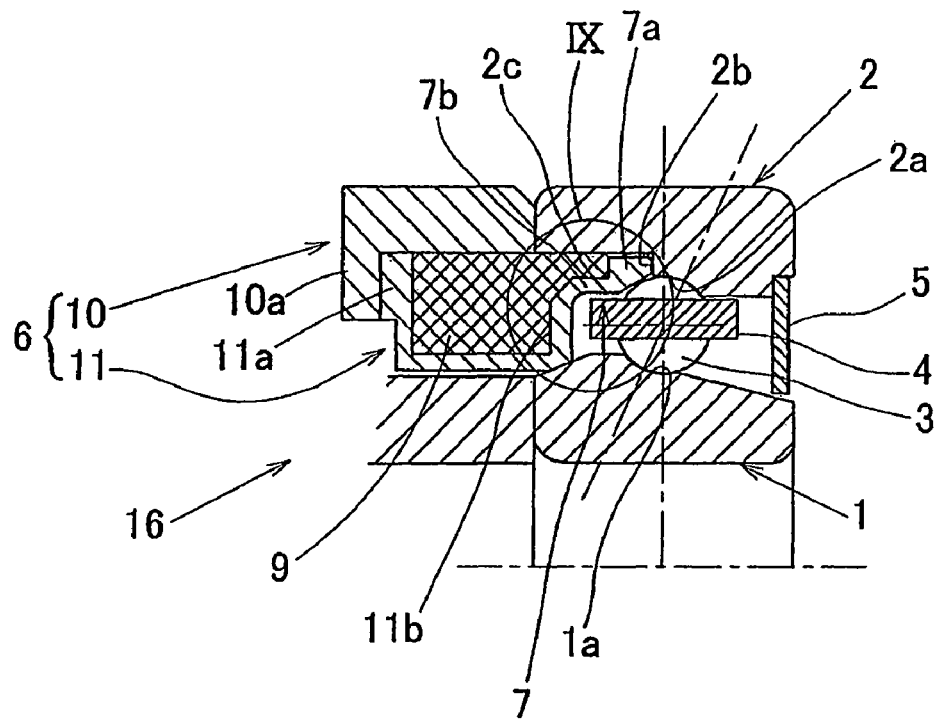
FIG. 8 is a fragmentary sectional view of the rolling bearing assembly according to a yet further modified form of the first embodiment.
Figure 9:
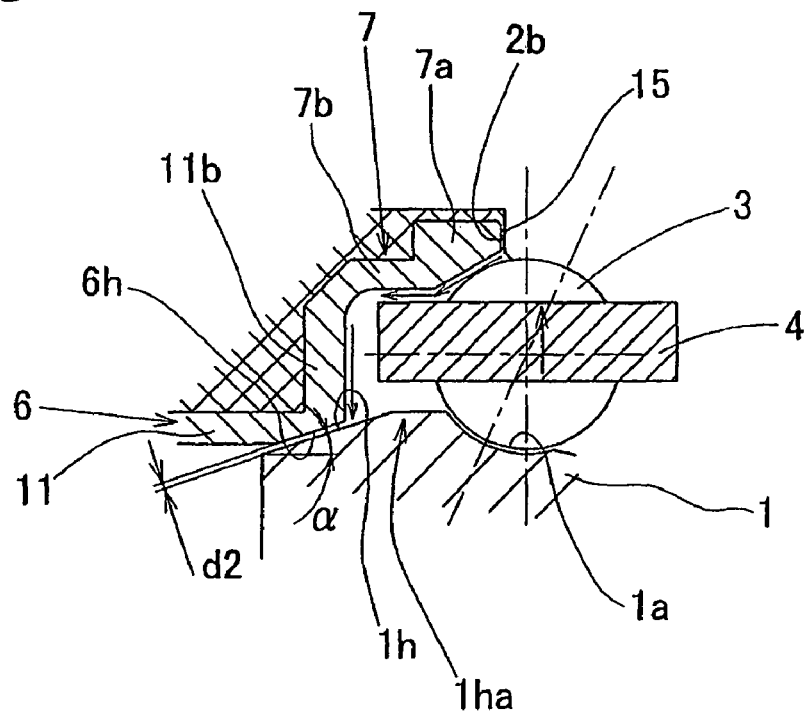
FIG. 9 is an enlarged cross-sectional view showing a portion of FIG. 8 marked by IX.

FIGS. 8 and 9 illustrates a yet further modified form of the rolling bearing assembly according to the first embodiment. The rolling bearing assembly according to this modification is similar to that shown in and described with reference to FIGS. 1 and 2, except that in this modification, tapered faces 6h and 1h, each inclined at such an angle of inclination a as to form a large diameter on one side adjacent the center of the bearing assembly, are provided in an inner peripheral surface of the grease reservoir forming component main body 11 of the grease reservoir forming component 6 and the outer peripheral surface of the inner race 1, respectively, so as to be spaced a small gap d2 from each other. The tapered face 1h in the inner race 1 extends from an end face of the inner race 1 towards a location adjacent the raceway surface 1a and an edge 1ha of this tapered face 1h on a large diameter side thereof is located on an inner diametric side within the limit of the width of the retainer 4. Other structural features thereof are similar to those shown in and described with reference to FIGS. 1 and 2.

Referring particularly to FIG. 9, arrow-headed lines shown therein indicate the flow of a separated oil in the grease. The grease base oil supplied from the grease reservoir 9 and flowing through the gap 15 between the stepped face 2b of the outer race 2 and the tip of the gap defining piece 7 flows in part directly into the raceway surface 2a of the outer race as a lubricant oil and in part towards the outer diametric surface of the inner race 2 by the effect of a current of ambient air without flowing into the bearing assembly as shown by the arrow-headed lines. That portion of the base oil flowing towards the outer diametric surface of the inner race 2 damps an outer surface of the grease reservoir forming component 6 before it reaches the outer diametric surface of the inner race 2. The outer diametric surface of the inner race is formed with the tapered face 1h as hereinabove described and is opposed in an overlapping relation to the tapered face 6h of the grease reservoir forming component 6 with a minute gap d2 intervening therebetween.

Because of the reason discussed above, the oil flowing towards the inner race 1 along the outer surface of the grease reservoir forming component 6 can be prevented from flowing outwardly of the bearing assembly by the effect of the difference in pressure (large diameter side<small diameter side) between opposite ends of the gap d2, which is induced as a result of rotation of the inner race 1. Also, the oil moving to the opposed portion and then deposited on the outer diametric surface of the inner race 1 moves towards the large diameter side of the tapered face 1h by the effect of the surface tension of the oil and the centrifugal force acting on the oil and is then scattered by the edge 1ha onto the inner diametric surface of the retainer 4. The oil so scattered is received in the retainer 4 and is therefore used as a bearing lubricant oil. Accordingly, the amount of the oil flowing outwardly of the bearing assembly decreases and the amount of the oil used as the lubricant oil increases, thus resulting in increase of the lubrication lifetime.

In the construction described above, the angle of inclination $\alpha$ of the tapered face 1h depends on the maximum rotational speed of the bearing assembly during use thereof and the surface tension of the oil and is so chosen that the oil can deposit and move on the tapered face 1h. Also, the gap d2 is determined in consideration of the amount of expansion of the inner race outer diametric surface during the operation and the amount of the oil having moved to the inner diametric surface of the grease reservoir forming component 6, which can be transferred towards the inner race 1. By way of example, if the bearing assembly having the inner race of a diameter of 100 mm is operated at 1,500 rpm, the inclination angle $\alpha$ is 15° and the gap size d2 is about 0.2 mm.

Figure 10:
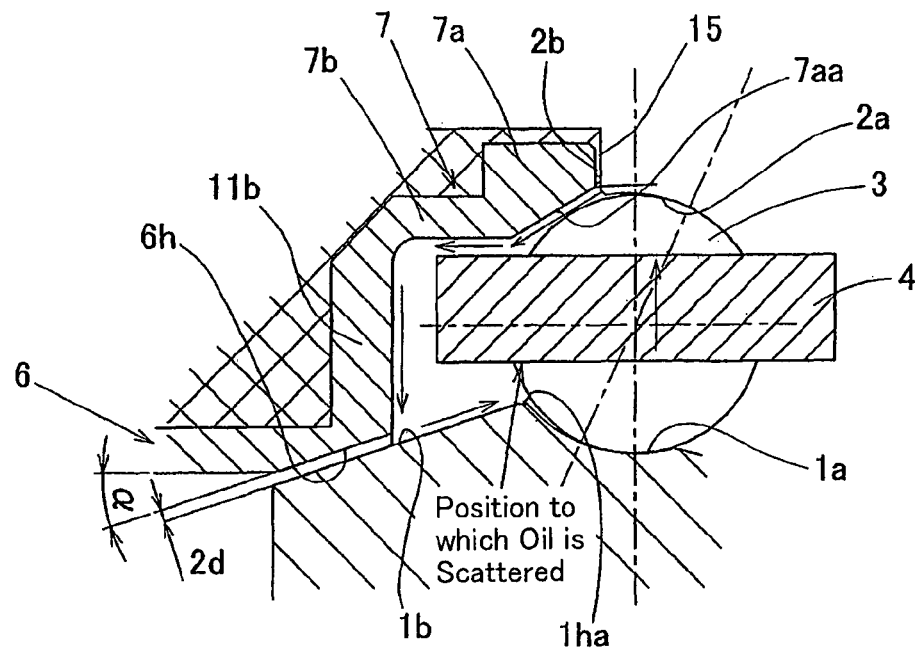
FIG. 10 is a fragmentary enlarged sectional view of the rolling bearing assembly according to a different modified form of the first embodiment.

In a different modification shown in FIG. 10, in order for the rolling bearing assembly to be assuredly lubricated, the modification shown in and described with particular reference to FIGS. 8 and 9 is so altered that the edge 1ha on the large diametric side of the tapered face 1h of the inner race 1 is positioned within a bearing axial direction width of the rolling elements 3. Since the rolling elements 3 in this embodiment are employed in the form of a ball, the edge 1ha is positioned within the diameter of each rolling element 3.

In the case of this construction, the oil scattered from the large diameter side edge 1ha of the inner race tapered face 1h can deposit directly on the rolling elements 3, thus further ensuring the lubrication of the bearing assembly.

Figure 11:
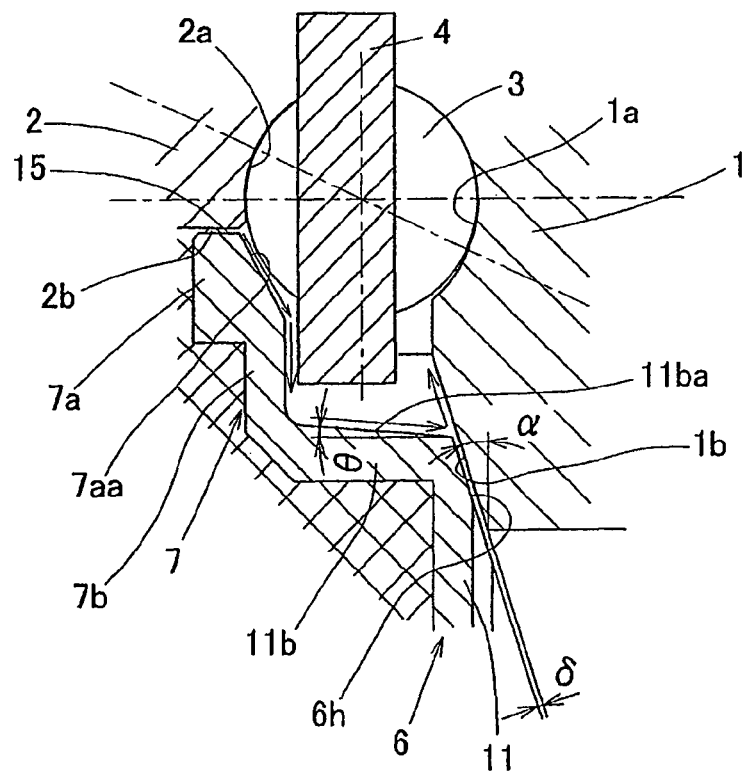
FIG. 11 is a fragmentary enlarged sectional view of the rolling bearing assembly according to a further different modified form of the first embodiment.

In a further different modification shown in FIG. 11, the modification shown in and described with particular reference to FIGS. 8 and 9 is so altered that the oil flowing along the outer surface of the grease reservoir forming component 6 can be more effectively deposited on the tapered face 1h of the outer diameter of the inner race 1 particularly where the rolling bearing assembly assumes a vertical posture. For this purpose, in this modification shown in FIG. 11, an outer surface 11ba of the side wall portion 11b inwardly of the bearing assembly, which forms the grease reservoir forming component main body 11 of the grease reservoir forming component 6 is rendered to be an inclined surface inclined at an angle of inclination $\theta$. The direction of inclination of the outer surface 11ba in the form of the inclined surface conforms to the direction in which the small diameter side, that is, the side of the inner race 1 separate away from an intermediate point of the bearing width. The inclination angle $\theta$ is so chosen as to be within the range of 5 to 10° in consideration of the flow of the oil. In this example, although the grease reservoir forming component 6 is shown as positioned below the rolling elements 3, the outer surface 11ba is preferably rendered to be an inclined surface in a manner similar to that described above, even where the grease reservoir forming component 6 is positioned above the rolling elements 3.

As hereinabove described, if the outer surface 11ba of the side wall portion 11b of the grease reservoir forming component 6 is formed as an inclined surface, the oil outflowing along the outer surface of the grease reservoir forming component 6 can be more effectively deposited on the tapered face 1h of the outer diameter of the inner race 1.

Figure 12:
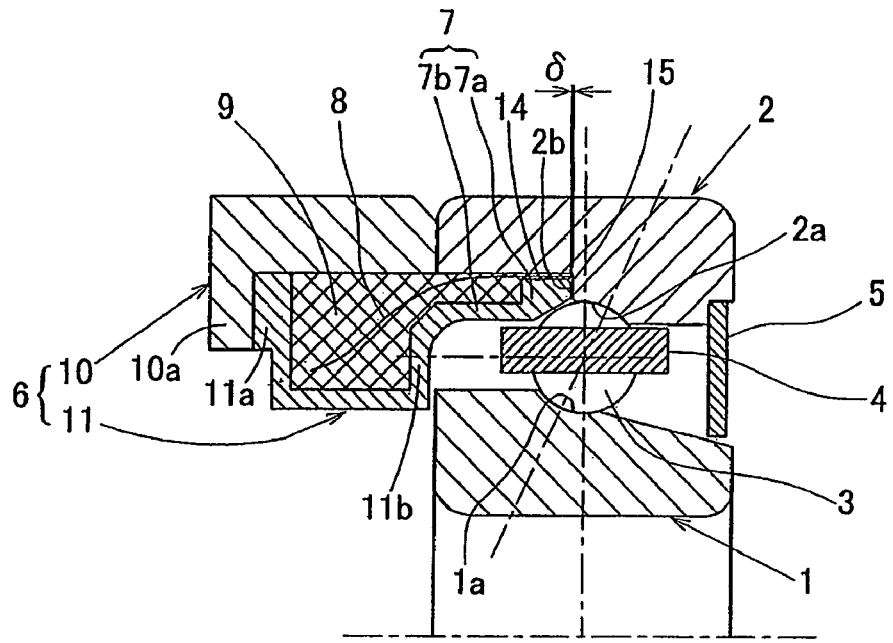
FIG. 12 is a fragmentary sectional view of the rolling bearing assembly according to a second preferred embodiment of the present invention.

FIG. 12 illustrates a second preferred embodiment of the present invention. The rolling bearing assembly according to this second embodiment is of a version, in which in the rolling bearing assembly according to the first embodiment and shown in FIG. 1, a base oil moving medium 8 is interposed in the flow path 14. The base oil moving medium 8 is effective to facilitate the supply of the base oil of the grease into the gap 15 (δ) by the capillary action within the flow path 14. The base oil moving medium 8 can be employed in the form of a piece of paper or a piece of woven textile.

In the case of this construction, movement of the grease base oil from the gap 15 towards the rolling element contact region can be facilitated further by the capillary action in the base oil moving medium 8. For this reason, the movement of the base oil can become better and assured and the amount of the base oil to be moved can be further increased. Also, by suitably selecting, for example, the material for, the circumferential length of the base oil moving medium 8, the amount of the grease base oil to be supplied can be adjusted, thus allowing the adjustment to be further easily effected to suit to an operating condition of the bearing assembly.

Figure 13:
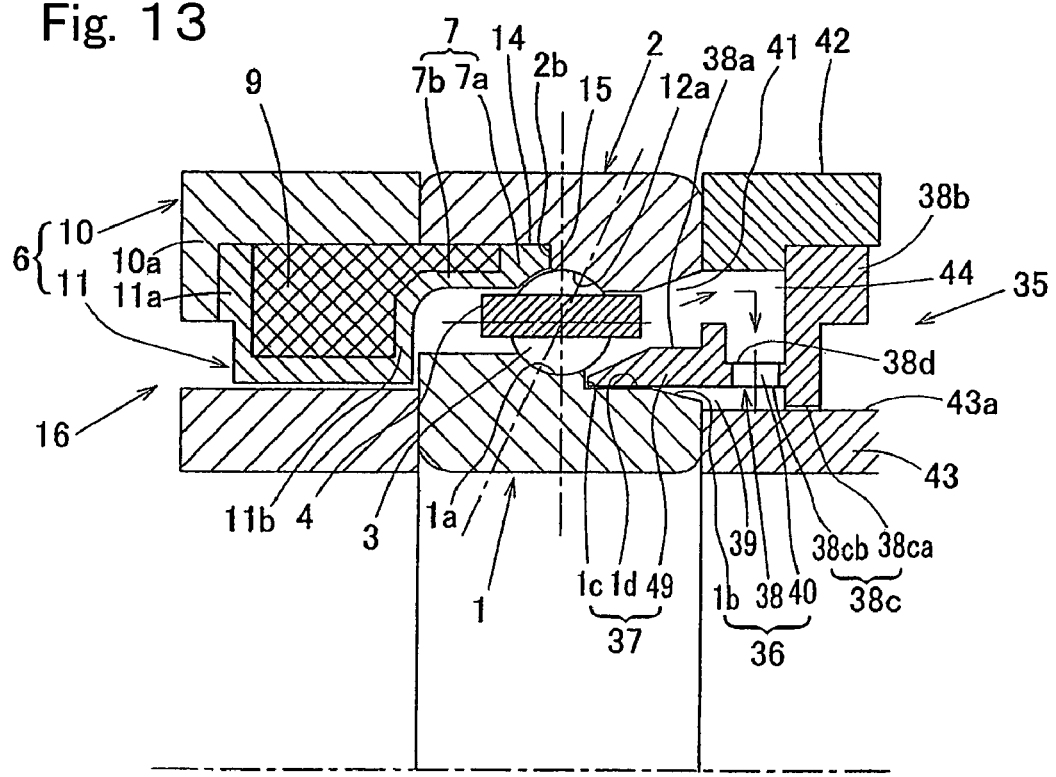
FIG. 13 is a fragmentary sectional view of the rolling bearing assembly according to a third preferred embodiment of the present invention.

FIG. 13 illustrates a third preferred embodiment of the present invention. The rolling bearing assembly according to this third embodiment is a version, in which in the rolling bearing assembly according to the first embodiment and shown in FIG. 1, separate from a grease supply module 16 made up of the grease reservoir forming component 6, the gap defining piece 7 and others, a mist recovery and recycling module 35 for recovering a mist within the bearing assembly, agglomerating it and returning the resultant agglutinate to a location in the vicinity of the raceway surface 2a of the outer race 2.

The mist recovery and recycling module 35 includes a recovery module 36 for recovering a mist of the grease, generated within the bearing assembly during the operation thereof, and an agglomerating and feeding module 37 for agglomerating the mist, recovered by the recovery module 36, to render the agglutinate to represent an oily matter and then feeding the agglutinate to the raceway surfaces 1a and 2a.

The recovery module 30 referred to above includes a tapered face 1b defined in the outer peripheral surface of the inner race 1, a mist recovery component 38 positioned in an outer periphery of the tapered face 1b for defining a recovery space 39 between it and the tapered face 1b, and a communicating passage 40 provided in the mist recovery component 38 and communicating from a mist suspending space 41 within the bearing assembly to the mist recovery space 39. The tapered face 1b of the inner race 1 is provided in the vicinity of a width direction end of the outer peripheral surface of the inner race 1 on the back side of the bearing assembly and has a large diameter on a side adjacent the raceway surface 1a.

The mist recovery component 38 is of a generally L-sectioned configuration made up of a cylindrical portion 38a coaxial with the inner race 1 and a collar-shaped mounting portion 38b extending radially outwardly from one end of the cylindrical portion 38 and is axially juxtaposed relative to the outer race 2 with the collar-shaped mounting portion 38b bonded to fix on an inner peripheral surface of a ring-shaped recovery component fixing member 42 that is provided in contact with an end face of the outer race 2 on the back side of the bearing assembly. Fixing of the mist recovery component 38 to the recovery component fixing member 42 may be accomplished by the use of a retaining ring other than by means of a bonding technique. With this mist recovery component 38 arranged in face-to-face relation with the outer periphery of the tapered face 1b of the inner race 1, the mist recovery space 39 of an annular tapered sectional shape is formed between the tapered face 1b and an inner peripheral surface 38c of the mist recovery component 38.

More specifically, the inner peripheral surface 38c of the mist recovery component 38 has one end thereof on a side remote from the bearing assembly, which is rendered to be a reduced diameter portion 38ca, and a portion thereof near to the bearing assembly from the reduced diameter portion 38ca, which is rendered to be a large diameter portion 38cb that is stepped relative to the reduced diameter portion 38ca. The mist recovery space 39 referred to above is a space encompassed by the tapered face 1b of the inner race 1, an outer peripheral surface 43a of an inner race spacer 43 in contact with the end face of the inner race 1 on the back side of the bearing assembly, and the large diameter portion 38cb of the inner peripheral surface of the mist recovery component 38. The large diameter portion 38cb of the inner peripheral surface of the mist recovery component 38 may have a roughness within the range of Ra 2 to 7. Accordingly, as the mist recovery component 38, a lathe turned component, a press worked component of a steel plate, or a molded component of a synthetic resin can be employed. The angle of inclination of the tapered face 1b relative to the axial direction is rendered to be of a value sufficient to induce the flow of the mist in a direction inwardly of the bearing assembly (in a direction of the rolling elements).

The agglomerating and feeding module 37 referred to previously is made up of a stepped face 1c provided in the vicinity of the raceway surface 1a in the outer peripheral surface of the inner race 1, an outer peripheral surface portion 1d continued from a reduced diameter end of the stepped face 1c to the tapered face 1b and an agglomerating gap forming member 49. The agglomerating gap forming member 49 has an inner peripheral surface, held in face-to-face relation with the outer peripheral surface of the inner race outer peripheral surface portion 1d through a gap, and a tip face held in face-to-face relation with the stepped face 1c through a gap; is provided in a fixed condition together with the outer race 2; and is comprised of a portion of the mist recovery component 38 that is continued towards a tip of the cylindrical portion 38a. The stepped face 1c referred to above is a surface continued with the raceway surface 1a on the back side of the bearing assembly and increased in diameter on a side adjacent the raceway surface 1a and is provided within a widthwise limit of the rolling elements 3, that is, immediately below the rolling elements 3.

An outer peripheral surface of the tip of the agglomerating gap forming member 49, which confronts the inner race stepped face 1c, is rendered to be a tapered face effective to retain the grease in an attached condition so that the grease attaching thereto can contact the rolling elements 3. A tapered face in the outer periphery of the cylindrical portion 38a plays a role of guiding the oily mist, which has been agglomerated by the agglomerating and feeding module 37, towards the mist recovery space 39 efficiently.

The outer peripheral surface continued from the tapered face of the cylindrical portion 38a of the mist recovery component 38 and located on the side remote from the bearing assembly is rendered to be a recessed portion 38d that is depressed radially inwardly, and the communicating passage 40 referred to previously is formed so as to extend from the recessed portion 38d through the large diameter portion 38cb of the inner peripheral surface. This communicating passage 40 is in the form of a throughhole formed at a plurality of locations in a direction circumferentially of the mist recovery component 38 and extending completely through the large diameter portion 38cb. A space encompassed by the recessed portion 38d and collar-shaped mounting portion 38b of the mist recovery component 38 and the recovery component fixing member 42 is a space communicated with the mist suspending space 41 and constitute a front stage mist recovery space 44, which is a recovery space at a front stage of the mist recovery space 39.

According to the rolling bearing assembly of the above described construction, supply of the grease within the grease reservoir 9 by means of the grease supply module 16 and reuse of the misted grease by means of the mist recovery and recycling module 35 are performed, and by the cumulative effect of both of those modules 16 and 35, only the grease filled in the bearing assembly is utilized to realize a speed-up and an increased lifetime and the maintenance-free feature. The details of the operation of the mist recovery and recycling module 35 referred to above will be described hereinafter.

When the inner race 1 of the bearing assembly filled with the grease rotates, at the respective raceway surfaces 1a and 2a of the inner and outer races 1 and 2, a portion of the base oil contained in the grease is misted as a result of contact with the rolling elements 3 then rolling and the resultant mist suspends within the mist suspending space 41 within the bearing assembly. The mist so induced moves in a direction shown by the arrow in FIG. 13 while rotating within the bearing assembly, by the effect of an air current resulting from revolution of the rolling elements 3 and subsequently flows into the front stage mist recovery space 44 that is encompassed by the recovery component fixing member 42 and the mist recovery component 38. Since the front stage mist recovery space 44 and the mist recovery space 39 are communicated with each other through the communicating passage 40, the mist within the front stage mist recovery space 44 further flows into the mist recovery space 39 by the effect of the difference in pressure between those spaces 44 and 39.

The mist within the mist recovery space 39 is sucked having been accelerated within the mist recovery space 39 in a direction inwardly of the bearing assembly by the pumping effect brought about by rotation of the inner race tapered face 1b. Thus, the mist suspending within the mist suspending space 41 can be efficiently recovered with a simplified structure of the recovery module 36. As a result thereof, the mist moves while impinging upon the large diameter portion 38cb of the inner peripheral surface of the mist recovery component 38 that confronts the outer peripheral surface portion 1d of the inner race 1, resulting in agglomeration of the mist.

The agglomerated mist forms an oily state and attaches to the large diameter portion 38cd of the inner peripheral surface. The oil so attaching moves in a direction inwardly of the bearing assembly by the effect of an air current within the gap between the cylindrical portion 38a of the mist recovery component 38 and the inner race 1 and is subsequently discharged as a bearing lubricating oil into the bearing assembly through the gap at the tip of the cylindrical portion 38a of the mist recovery component 3 8.

As a structure for facilitating the movement of the mist in the manner described above, the outer peripheral surface of the inner race 1 may be formed with a tapered face 1b over a region thereof from a reduced diameter end of the stepped face 1c towards an end face thereof, in which case an outer peripheral portion 1d of a cylindrical surface shape that resides halfway may be eliminated.

Since the inner race stepped face 1c forming a radial display gap continues to the raceway surface 1a of the inner race 1 and is provided within the widthwise limit of the rolling elements 3, discharge of the oil onto the raceway surface 1a of the inner race can take place effectively. In order to enable the discharge of the oil into the bearing assembly assuredly, the grease is attached preferably to the entire circumference of the tapered face comprised of the outer peripheral surface of the agglomerating gap forming member 49 and the actual gap through which the oil is discharged is preferably reduced in size. Attachment of the grease to the outer peripheral surface of the mist recovery component 38 may be realized in the form of a deposition formed when the bearing assembly is operated with the grease filled in an initial condition.

As hereinbefore described, with the lubrication with the mist recovery and recycling module 35 in the rolling bearing assembly, since the mist of the base oil formed during the operation is recovered and reused during the lubrication with the grease, it is possible to prolong a lubrication lifetime. Also, in contrast to the conventional supply of the grease, in which the grease is supplemented from the outside during the rotation of the inner race, the filled grease is cyclically used to achieve a lubrication with a slight amount of the lubricant oil and, therefore, it does in no way constitute a cause of temperature increase brought about by an agitating resistance when the grease is supplied excessively, making it possible to achieve a speed-up of rotation.

Also, since in the third embodiment described above, both of the grease reservoir forming component 6 in the grease supply module 16 and the recovery module 36 in the mist recovery and recycling module 35 are provided in an axially neighboring relation to the outer race 2, as compared with the case in which they are accommodated within the widthwise limit of the outer race, the region in which the grease is supplied by the grease supply module 16 and the region in which the mist is recovered by the mist recovery and recycling module 35 can be secured large, enabling those functions to be accomplished effectively.

It is to be noted that each of the foregoing embodiments has been shown and described, in which the outer race 2 serves as the stationary raceway member. However, of those embodiments, the modifications of the first embodiment shown respectively in FIGS. 1 to 7 and the second embodiment shown in FIG. 12 may equally apply in a manner similar to the foregoing even when the inner race 1 serves as the stationary raceway member.

Also, in each of the modifications of the first embodiment shown respectively in FIGS. 1 to 11 and the third embodiment shown in FIG. 13, the base oil moving medium 8 may be interposed in a manner similar to that described in connection with the second embodiment with reference to FIG. 12.

What is claimed is:
1. A rolling bearing assembly which comprises
an inner race;
an outer race; and
a plurality of rolling elements interposed between respective raceway surfaces of the inner and outer races,
wherein one of the inner race and the outer race is a non-rotatable stationary raceway member,
wherein the stationary raceway member is provided with a stepped face continued with the corresponding raceway surface,
wherein the stepped face extends in a radial direction away from the rolling elements,
wherein the stationary raceway member is provided with a gap defining piece having a tip held in face-to-face relation to the stepped face to form a gap between the tip and the stepped face, the gap defining piece defining a flow path between a peripheral wall thereof and the stationary raceway member, there being provided a grease reservoir communicated with the flow path, and wherein the gap between the stepped face and the tip of the gap defining piece is of a size sufficient to reserve a base oil of a grease at all times and also to allow the base oil to be supplied to the raceway surface by means of an air current in the vicinity of the raceway surface and a volumetric expansion of the base oil, which are both induced by rotation of the bearing assembly.

2. The rolling bearing assembly as claimed in claim 1, wherein the stationary raceway member is the outer race.

3. The rolling bearing assembly as claimed in claim 1, wherein the grease reservoir is provided on one side axially relative to the raceway surface and a mist recovery and recycling module for recovering a mist within the bearing assembly, agglomerating it and returning the resultant agglutinate to a location in the vicinity of the raceway surface is provided on the other side axially relative to the raceway surface.

4. The rolling bearing assembly as claimed in claim 1,
wherein the bearing assembly is an angular ball bearing having an angle of contact defined from a vertical axis, and
wherein the stepped face is provided in continuance with an edge portion of the raceway surface, and is formed in a direction opposite the angle of contact.

5. The rolling bearing assembly as claimed in claim 1, wherein the grease reservoir is defined by a grease reservoir forming component, which comprises a spacer, provided adjacent the stationary raceway member, and a grease reservoir forming component main body provided on one of an inner peripheral side and an outer peripheral side of the spacer and adjacent to a bearing space, and further comprising a sealing member interposed between respective mating surfaces of the spacer and stationary raceway member.

6. The rolling bearing assembly as claimed in claim 1, wherein the grease reservoir is defined by a grease reservoir forming component, which comprises a spacer, provided adjacent the stationary raceway member, and a grease reservoir forming component main body provided on one of an inner peripheral side and an outer peripheral side of the spacer and adjacent to a bearing space, the spacer being provided with a collar mountable on a peripheral surface of the stationary raceway member on one side adjacent a bearing space, and further comprising a sealing member interposed between the collar and the stationary raceway member at a location where the collar is mounted on the stationary raceway member.

7. The rolling bearing assembly as claimed in claim 1, wherein the stationary raceway member is provided with a raceway member extension for forming the grease reservoir and extending in a widthwise direction and wherein the grease reservoir is made up of this raceway member extension and a unitary grease reservoir forming component provided on one side of the raceway member extension adjacent a bearing space.

8. The rolling bearing assembly as claimed in claim 1, wherein a peripheral surface of the tip of the gap defining piece on a bearing space side, which is continued to an end face at the tip of the gap defining piece, is formed as a tapered surface approaching the rolling elements and a distance between this tapered surface and the rolling elements is chosen to be equal to or smaller than 0.2 mm.

9. The rolling bearing assembly as claimed in claim 1, wherein a peripheral surface of the tip of the gap defining piece on a bearing space side, which is continued to an end face at the tip of the gap defining piece, is formed as a curved surface of an arcuately sectioned configuration having a center of curvature aligned with a center of each of the rolling elements and a distance between this curved surface and each rolling element is chosen to be equal to or smaller than 0.2 mm.

10. The rolling bearing assembly as claimed in claim 1,
wherein the stationary raceway member is an outer race and the grease reservoir is defined by a grease reservoir forming component provided in an inner periphery of the outer race or a spacer adjoining the outer race,
wherein an inner peripheral surface of the grease reservoir forming component and an outer peripheral surface of the inner race are provided with respective tapered faces opposed to each other with a minute gap intervening therebetween, and
wherein the tapered faces have a large diameter on one side adjacent a center of the bearing assembly.

11. The rolling bearing assembly as claimed in claim 10, further comprising:
a retainer that retains the rolling elements,
wherein the tapered face of the inner race has a first edge and a second edge, the inner race having a larger diameter at a location of the first edge than at a location of the second edge, and
wherein the first edge is positioned directly on an inner diametric side of the retainer.

12. The rolling bearing assembly as claimed in claim 10,
wherein the tapered face of the inner race has a first edge and a second edge, the inner race having a larger diameter at a location of the first edge than at a location of the second edge, and
wherein the first edge is positioned directly in a bearing axial direction of the rolling elements.

13. The rolling bearing assembly as claimed in claim 10, wherein the rolling bearing assembly is of a type that is used with its longitudinal axis oriented vertically, wherein the grease reservoir forming component has a side wall portion oriented towards an intermediate point of a width of the bearing assembly and having the gap defining piece continued from an outer diametric side end thereof and wherein an outer surface of this side wall portion is formed as an inclined surface having a small diameter side inclined away from the intermediate point of the width of the bearing assembly.

14. A rolling bearing assembly which comprises:
an inner race;
an outer race; and
a plurality of rolling elements interposed between respective raceway surfaces of the inner and outer races,
wherein one of the inner race and the outer race is a non-rotatable stationary raceway member,
wherein the stationary raceway member is provided with a stepped face continued with the corresponding raceway surface,
wherein the stepped face extends in a radial direction away from the rolling elements,
wherein the stationary raceway member is provided with a gap defining piece having a tip held in face-to-face relation to the stepped face to form a gap between the tip and the stepped face, the gap defining piece defining a flow path between a peripheral wall thereof and the stationary raceway member, there being provided a grease reservoir communicated with the flow path, and
wherein a base oil moving medium for facilitating a supply of a base oil of a grease from the grease reservoir to the flow path in the gap defining piece.

15. The rolling bearing assembly as claimed in claim 14, wherein the base oil moving medium comprises a piece of paper or a piece of woven textile.

16. The rolling bearing assembly as claimed in claim 14, wherein the stationary raceway member is the outer race.

17. The rolling bearing assembly as claimed in claim 14, wherein the grease reservoir is provided on one side axially relative to the raceway surface and a mist recovery and recycling module for recovering a mist within the bearing assembly, agglomerating it and returning the resultant agglutinate to a location in the vicinity of the raceway surface is provided on the other side axially relative to the raceway surface.

18. The rolling bearing assembly as claimed in claim 14,
  wherein the bearing assembly is an angular ball bearing having an angle of contact defined from a vertical axis, and
  wherein the stepped face is provided in continuance with an edge portion of the raceway surface, and is formed in a direction opposite the angle of contact.

19. The rolling bearing assembly as claimed in claim 14, wherein the grease reservoir is defined by a grease reservoir forming component, which comprises a spacer, provided adjacent the stationary raceway member, and a grease reservoir forming component main body provided on one an inner peripheral side and an outer peripheral side of the spacer and adjacent to a bearing space, and further comprising a sealing member interposed between respective mating surfaces of the spacer and stationary raceway member.

20. The rolling bearing assembly as claimed in claim 14, wherein the grease reservoir is defined by a grease reservoir forming component, which comprises a spacer, provided adjacent the stationary raceway member, and a grease reservoir forming component main body provided on one of an inner peripheral side and an outer peripheral side of the spacer and adjacent to a bearing space, the spacer being provided with a collar mountable on a peripheral surface of the stationary raceway member on one side adjacent a bearing space, and further comprising a sealing member interposed between the collar and the stationary raceway member at a location where the collar is mounted on the stationary raceway member.

21. The rolling bearing assembly as claimed in claim 14, wherein the stationary raceway member is provided with a raceway member extension for forming the grease reservoir and extending in a widthwise direction and wherein the grease reservoir is made up of this raceway member extension and a unitary grease reservoir forming component provided on one side of the raceway member extension adjacent a bearing space.

22. The rolling bearing assembly as claimed in claim 14, wherein a peripheral surface of the tip of the gap defining piece on a bearing space side, which is continued to an end face at the tip of the gap defining piece, is formed as a tapered surface approaching the rolling elements and a distance between this tapered surface and the rolling elements is chosen to be equal to or smaller than 0.2 mm.

23. The rolling bearing assembly as claimed in claim 14, wherein a peripheral surface of the tip of the gap defining piece on a bearing space side, which is continued to an end face at the tip of the gap defining piece, is formed as a curved surface of an arcuately sectioned configuration having a center of curvature aligned with a center of each of the rolling elements and a distance between this curved surface and each rolling element is chosen to be equal to or smaller than 0.2 mm.

24. The rolling bearing assembly as claimed in claim 14,
  wherein the stationary raceway member is an outer race and the grease reservoir is defined by a grease reservoir forming component provided in an inner periphery of the outer race or a spacer adjoining the outer race,
  wherein an inner peripheral surface of the grease reservoir forming component and an outer peripheral surface of the inner race are provided with respective tapered faces opposed to each other with a minute gap intervening therebetween, and
  wherein the tapered faces have a large diameter on one side adjacent a center of the bearing assembly.

25. The rolling bearing assembly as claimed in claim 24, further comprising:
  a retainer that retains the rolling elements,
  wherein the tapered face of the inner race has a first edge and a second edge, the inner race having a larger diameter at a location of the first edge than at a location of the second edge, and
  wherein the first edge is positioned directly on an inner diametric side of the retainer.

26. The rolling bearing assembly as claimed in claim 24,
  wherein the tapered face of the inner race has a first edge and a second edge, the inner race having a larger diameter at a location of the first edge than at a location of the second edge, and
  wherein the first edge is positioned directly in a bearing axial direction of the rolling elements.

27. The rolling bearing assembly as claimed in claim 24, wherein the rolling bearing assembly is of a type that is used with its longitudinal axis oriented vertically, wherein the grease reservoir forming component has a side wall portion oriented towards an intermediate point of a width of the bearing assembly and having the gap defining piece continued from an outer diametric side end thereof and wherein an outer surface of this side wall portion is formed as an inclined surface having a small diameter side inclined away from the intermediate point of the width of the bearing assembly.

* * * * *